A. P. Bussey,
Milk Cooler.
No. 108,448.   Patented Oct. 18, 1870.
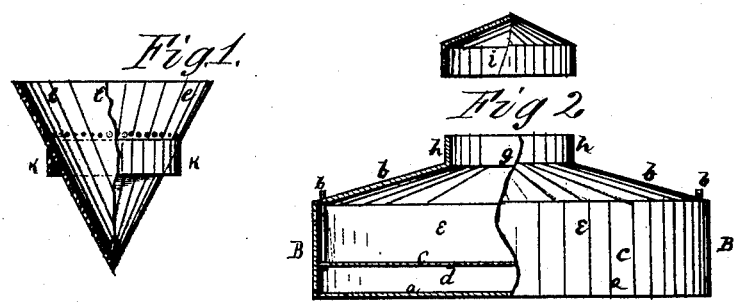
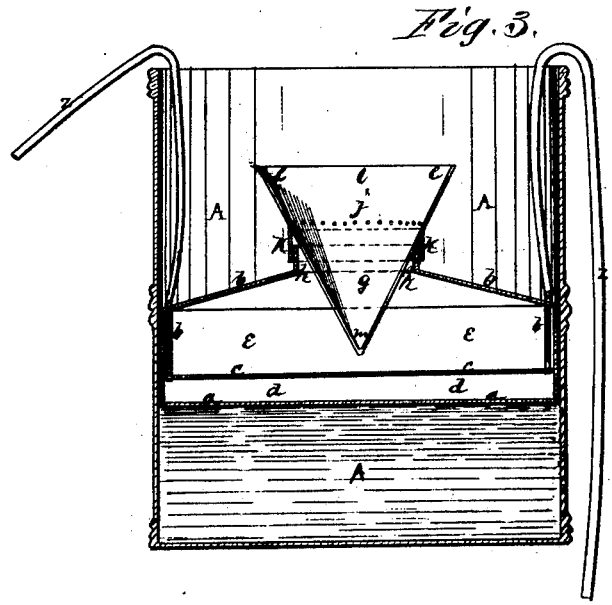
Witnesses:
Erastus Ely
John O. Jines
Inventor,
A. P. Bussey

United States Patent Office.

A. P. BUSSEY, OF WESTERNVILLE, NEW YORK.

Letters Patent No. 108,448, dated October 18, 1870.

IMPROVEMENT IN MILK AND LIQUID-COOLERS.

The Schedule referred to in these Letters Patent and making part of the same.

*To all whom it may concern:*

Be it known that I, A. P. BUSSEY, of Westernville in the county of Oneida and State of New York, have invented a new and valuable Improvement in Means for Deodorizing Milk or Cooling Liquids; and I do hereby declare that the following is a full, clear, and exact description of the construction and operation of the same, reference being had to the annexed drawing making a part of this specification, and to the letters and figures of reference marked thereon.

Figure 1, of the accompanying drawing, is a central vertical section of the removable funnel and strainer;

Figure 2 is similar sectional view of the floating cooler; and

Figure 3 is a similar sectional view of the milk-can, with the cooler resting upon the milk within it.

My invention relates to means for cooling and deodorizing milk, or for cooling or heating other liquids, and consists in the construction and novel arrangement of a floating vessel containing ice, or provided with siphons for keeping up a constant flow of cold or hot water through it, and having a funnel provided with outlets in the form of a circle of apertures, adjustable in its mouth, whereby the milk or other liquid to be heated or cooled is distributed or spread evenly over the exterior of the top and sides of the cooler, in such a manner as to bring all the particles of the liquid successively in contact with the heating or cooling surface.

The letter A of the drawing designates an ordinary milk-can or pail.

B is the cooler, made of the proper size and shape, to fit neatly within the can or pail, and, at the same time, to have a free movement up or down within it.

The bottom *a* of the cooler is plane, and the top *b* thereof is conical, or sloping upward and inward to the flanch *h* of the mouth *g*.

A false bottom or plate, *c*, is constructed within the cooler in such a manner as to form a compartment, *d*, below the compartment E.

Tubes or conduits *f f* communicate with the compartment *d*, and extend upward through the conical top *b* of the cooler.

*j* represents the distributing-strainer, in the form of a funnel or inverted cone.

It is provided with a waist-flanch, *k*, attached around its exterior surface, and turned downward, in such a manner that, when the point *m* is inserted into the mouth of the cooler B, this flanch will encircle or overlie the flanch *h* of the mouth.

Immediately above the flanch *k* a circle of apertures or a strip of wire-cloth is arranged, and thereby an outlet is given to the liquid poured into the funnel-shaped strainer.

*i* represents a cover, designed to close the mouth *g* when the strainer *j* is removed.

In order to cause a flow of water through the cooler, flexible tubes, *z*, of rubber or other suitable material, are attached to the ends of the tubes *f*, which project above the top of the cooler.

The operation of my devices may be thus described:

The compartment E is intended to contain ice. The compartment *d* is filled with cool water through the tubes *f f*, and their flexible attachments *z* are likewise filled and corked up at the ends.

The vessel being placed in the desired position near a spring or reservoir of cool water, the end of one of the flexible tubes is inserted therein, and uncorked. Then the other tube, having been allowed to hang down lower than the first, is also relieved of its stopper, and the combination of siphons thus formed produces the flow.

The milk or other liquid to be cooled is now poured into the funnel *j*, from out of which it passes through the distributing apertures or strainer in the side, over the flanch *k*, and is spread in an even sheet over the top *b* and sides of the cooler. As the liquid accumulates in the can A, the cooler rises, and, floating upon the top thereof, keeps the upper surface cool.

Thus milk in its warm state is spread out in a thin sheet over a cool surface, in contact with which all the particles are successively brought, and thereby freed from animal heat and odor and cooled for use.

Other liquids may be cooled in rapid manner by these devices, and by substituting hot water for the ice in the upper compartment, and passing hot water or steam through the lower chamber, they may be used to great advantage for heating purposes.

The invention herein described is an improvement upon my milk-cooler, for which Letters Patent No. 96,390 were issued November 2, 1869.

What I claim as my invention, and desire to secure by Letters Patent, is—

1. In combination with a cooling or heating vessel, the funnel *j*, closed at the point *m*, and provided with the waist-flanch *k*, and immediately above it a circle of perforations or wire-cloth, substantially as shown and described.

2. In combination with the cooling-vessel B, herein described, having false bottom *c* and tubes *f*, the flexible conduits *z*, when constructed and arranged to operate as specified.

A. P. BUSSEY.

Witnesses:
ERASTUS ELY,
JOHN O. JONES.